US009039938B2

(12) United States Patent
Crain et al.

(10) Patent No.: US 9,039,938 B2
(45) Date of Patent: *May 26, 2015

(54) COATINGS CONTAINING FUNCTIONALIZED GRAPHENE SHEETS AND ARTICLES COATED THEREWITH

(75) Inventors: John M. Crain, Washington, DC (US); John S. Lettow, Washington, DC (US); Ilhan A. Aksay, Princenton, NJ (US); Robert K. Prud'Homme, Princeton, NJ (US); Sibel Korkut, Princeton, NJ (US)

(73) Assignees: The Trustees of Princeton University, Princeton, NJ (US); VORBECK MATERIALS CORPORATION, Jessup, MD (US)

( * ) Notice: Subject to any disclaimer, the term of this patent is extended or adjusted under 35 U.S.C. 154(b) by 796 days.

This patent is subject to a terminal disclaimer.

(21) Appl. No.: 12/866,089

(22) PCT Filed: Jan. 9, 2009

(86) PCT No.: PCT/US2009/030579
§ 371 (c)(1),
(2), (4) Date: Nov. 19, 2010

(87) PCT Pub. No.: WO2009/123771
PCT Pub. Date: Oct. 8, 2009

(65) Prior Publication Data
US 2011/0049437 A1 Mar. 3, 2011

Related U.S. Application Data

(60) Provisional application No. 61/026,268, filed on Feb. 5, 2008.

(51) Int. Cl.
| | | |
|---|---|---|
| *H01B 1/04* | (2006.01) | |
| *C09D 5/24* | (2006.01) | |
| *C09D 7/12* | (2006.01) | |
| *H01B 1/24* | (2006.01) | |
| *B82Y 10/00* | (2011.01) | |
| *C08K 3/04* | (2006.01) | |

(52) U.S. Cl.
CPC ............... *C09D 5/24* (2013.01); *C09D 7/1291* (2013.01); *H01B 1/04* (2013.01); *H01B 1/24* (2013.01); *B82Y 10/00* (2013.01); *C08K 3/04* (2013.01)

(58) Field of Classification Search
CPC ...... B82Y 30/00; B82Y 40/00; Y02E 60/122; C08K 3/04; H01M 4/625; H01B 1/04; H01B 1/24
USPC ............... 977/701, 734, 755; 252/378 R, 502
See application file for complete search history.

(56) References Cited

U.S. PATENT DOCUMENTS

| | | | |
|---|---|---|---|
| 6,265,466 B1 | 7/2001 | Glatkowski et al. | |
| 7,060,241 B2 | 6/2006 | Glatkowski | |
| 7,115,221 B1 | 10/2006 | Spahr et al. | |
| 7,118,693 B2 | 10/2006 | Glatkowski et al. | |
| 7,623,340 B1 * | 11/2009 | Song et al. ..................... 361/502 |
| 7,658,901 B2 | 2/2010 | Prud'Homme et al. | |
| 7,659,350 B2 | 2/2010 | Prud'Homme et al. | |
| 7,745,528 B2 | 6/2010 | Prud'Homme et al. | |
| 7,771,824 B2 | 8/2010 | Herrera-Alonso et al. | |
| 2006/0286025 A1 | 12/2006 | Spahr et al. | |
| 2007/0092432 A1* | 4/2007 | Prud'Homme et al. ...... 423/448 |
| 2007/0131915 A1 | 6/2007 | Stankovich et al. | |
| 2007/0284557 A1 | 12/2007 | Gruner et al. | |
| 2008/0302561 A1 | 12/2008 | Prud'Homme et al. | |
| 2008/0306225 A1 | 12/2008 | Prud'Homme et al. | |
| 2008/0312368 A1 | 12/2008 | Prud'Homme et al. | |
| 2008/0315453 A1* | 12/2008 | Molitor et al. ............. 264/209.1 |
| 2009/0017211 A1 | 1/2009 | Gruner et al. | |
| 2009/0053433 A1 | 2/2009 | Prud'Homme et al. | |
| 2009/0053437 A1 | 2/2009 | Prud'Homme et al. | |
| 2009/0054272 A1 | 2/2009 | Prud'Homme et al. | |
| 2009/0054578 A1 | 2/2009 | Prud'Homme et al. | |
| 2009/0054581 A1 | 2/2009 | Prud'Homme et al. | |
| 2009/0123752 A1 | 5/2009 | Prud'Homme et al. | |
| 2009/0123843 A1 | 5/2009 | Aksay et al. | |
| 2009/0127514 A1 | 5/2009 | Korkut et al. | |
| 2009/0233057 A1 | 9/2009 | Aksay et al. | |
| 2010/0096595 A1 | 4/2010 | Prud'Homme et al. | |
| 2011/0052476 A1 | 3/2011 | Prud'Homme et al. | |
| 2011/0052813 A1* | 3/2011 | Ho et al. ....................... 427/256 |
| 2012/0145234 A1 | 6/2012 | Roy-Mayhew et al. | |

FOREIGN PATENT DOCUMENTS

| | | |
|---|---|---|
| JP | 2003-231098 | 8/2003 |
| JP | 2010-506013 | 2/2010 |
| JP | 2010-506014 | 2/2010 |
| JP | 2010-535690 | 11/2010 |

(Continued)

OTHER PUBLICATIONS

Schniepp, H., et al, "Functionalized Single Graphene Sheets Derived from Splitting Graphite Oxide," J. Phys. Chem. B Letters, 2006, 110, 8535-8539.*
U.S. Appl. No. 12/866,306, filed Aug. 5, 2010, Aksay, et al.
The Extended European Search Report issued May 13, 2011, in Application No. / Patent No. 09727595.2-1217 / 2240405 PCT/US2009030579.
Communication Pursuant to Rules 70(2) and 70a(2) EPC issued May 31, 2011, in Application No. / Patent No. 09727595.2-1217 / 2240405 PCT/US2009030579.
U.S. Appl. No. 13/510,678, filed Jun. 14, 2012, Roy-Mayhew, et al.
U.S. Appl. No. 12/791,190, filed Jun. 1, 2010, Prud'Homme, et al.
U.S. Appl. No. 12/866,079, filed Aug. 4, 2010, Crain, et al.

(Continued)

*Primary Examiner* — Mark Kopec
*Assistant Examiner* — William Young
(74) *Attorney, Agent, or Firm* — Oblon, McClelland, Maier & Neustadt, L.L.P.

(57) ABSTRACT

Coatings are provided containing functionalized graphene sheets and at least one binder. In one embodiment, the coatings are electrically conductive.

25 Claims, No Drawings

(56) References Cited

FOREIGN PATENT DOCUMENTS

| | | |
|---|---|---|
| JP | 2011-510906 | 4/2011 |
| JP | 2011-520741 | 7/2011 |
| WO | WO 2007/047984 A2 | 4/2007 |

OTHER PUBLICATIONS

U.S. Appl. No. 13/603,818, filed Sep. 5, 2012, Crain, et al.

Office Action issued on Jun. 25, 2013 in the corresponding Chinese Patent Application No. 200980110150.5 (with English Translation).

Combined Office Action and Search Report issued Aug. 22, 2012 in Chinese Patent Application No. 200980110150.5 with English language translation.

Office Action issued Aug. 27, 2013 in Japanese Application No. 2010-545912 (With English Translation).

Sasha Stankovich, et al., "Graphene-based composite materials", Nature, vol. 442, Jul. 20, 2006, pp. 282-286.

Hannes C. Schniepp, et al., "Functionalized single Graphene Sheets Derived from Splitting Graphite Oxide", Journal of Physical Chemistry B, vol. 110, No. 17, published on web Apr. 11, 2006, pp. 8535-8539.

U.S. Appl. No. 14/017,869, filed Sep. 4, 2013, Aksay, et al.

Office Action issued on Mar. 24, 2014, in Japanese Patent Application No. 2010545912 filed Jan. 9, 2009 (w/English translation).

U.S. Appl. No. 14/189,501, filed Feb. 25, 2014, Crain, et al.

\* cited by examiner

COATINGS CONTAINING FUNCTIONALIZED GRAPHENE SHEETS AND ARTICLES COATED THEREWITH

This invention was made with Government support under Grant No. CMS-0609049, awarded by the National Science Foundation, and under Grant No. NCC1-02037, awarded by NASA. The Government has certain rights in the invention.

FIELD OF THE INVENTION

The present invention relates to coatings comprising functionalized graphene sheets and at least one binder. The coatings can be electrically conductive.

BACKGROUND

Surface coatings can used to impart articles with desirable properties that are not possessed by the articles themselves or not possessed in a sufficient degree. For example, there are myriad applications for which it would be desirable to use electrically conductive and/or thermally conductive components having good physical properties. Because of their intrinsic conductivities and frequently advantageous physical properties, metals are often useful for such applications but can have drawbacks, including increased weight, cost, and that they can be difficult and/or inconvenient to form into a variety of shapes, including intricate parts.

Many of these drawbacks can be overcome by the use of polymeric materials, which can have cost, weight, processability, and flexibility of design advantages over metals. However, most polymer materials are not intrinsically electrically or thermally conductive enough for many applications. Conductive polymeric resin compositions can be made in some cases by adding fillers to polymers, but high loadings are often required, which can be to the detriment of physical and other properties of the materials, as well as lead to melt processing difficulties when thermoplastic materials are used, among other possible drawbacks.

In many cases, it would be sufficient for only a portion of a part be conductive. For example, as electronics become more and more pervasive, it is becoming increasingly important that a variety materials having electromagnetic interference (EMI) shielding properties be readily available. Housings for many electronic parts can be conveniently made from polymeric materials, but few useful polymers are sufficiently electrically conductive to be EMI shielding, necessitating the use of conductive additives, which can often have deleterious effects on other properties (such as physical properties) of the materials. It would thus be desirable to conveniently obtain an electrically conductive coating that could be applied to a polymeric housing or other article to achieve a desired degree of EMI shielding.

Electrically conductive coatings can also be advantageously used with metals. For example, electrically conductive coatings can be used to provide metal structures with long-lasting corrosion resistance.

Coatings can also be used for countless other applications, including providing UV radiation resistance, abrasion resistance, thermal conductivity, impact resistance, stiffness, and many others.

It would be desirable to obtain coatings that can be used with a wide variety of substrates to provide useful properties.

U.S. Pat. No. 6,265,466 discloses an electromagnetic shielding composite having nanotubes. U.S. Pat. No. 7,060,241 discloses electrically conductive films including carbon nanotubes. U.S. Pat. No. 7,118,693 discloses conformal coatings that provide shielding against electromagnetic interference that comprise an insulating layer and a conducting layer containing electrically conductive material. US 2007/0092432 discloses thermally exfoliated graphite oxide.

SUMMARY OF THE INVENTION

Disclosed and claimed herein are coatings comprising functionalized graphene sheets and at least one binder. Further disclosed and claimed herein is a method for coating a substrate with a coating comprising functionalized graphene sheets and at least one binder.

DESCRIPTION

As used herein, the term "coating" refers to a coating in a form that is suitable for application to a substrate as well as the material after it is applied to the substrate, while it is being applied to the substrate, and both before and after any post-application treatments (such as evaporation, cross-linking, curing, and the like). The components of the coating compositions may vary during these stages.

The coatings comprise high surface area functionalized graphene sheets and at least one binder and may optionally comprise additional components, such as at least one carrier other than a binder.

Preferred binders are polymeric binders. Polymeric binders can be thermoplastics or thermosets and may be elastomers. Binders may also comprise monomers that can be polymerized before, during, or after the application of the coating to the substrate. Polymeric binders may be cross-linked or otherwise cured after the coating has been applied to the substrate. Examples of preferred polymeric binders include polyethers such as poly(ethylene oxide)s (also known as poly(ethylene glycol)s, poly(propylene oxide)s (also known as poly(propylene glycol)s, and ethylene oxide/propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates), and poly(vinyl butyral, polyvinyl alcohol and its derivatives, ethylene/vinyl acetate polymers, acrylic polymers and copolymers, styrene/acrylic copolymers, styrene/maleic anhydride copolymers, isobutylene/maleic anhydride copolymers, vinyl acetate/ethylene copolymers, ethylene/acrylic acid copolymers, polyolefins, polystyrenes, olefin and styrene copolymers, epoxy resins, acrylic latex polymers, polyester acrylate oligomers and polymers, polyester diol diacrylate polymers, UV-curable resins, and polyamide, including polyamide polymers and copolymers (i.e., polyamides having at least two different repeat units) having melting points between about 120 and 255° C. (such as those sold under the trade names Macromelt by Henkel and Versamid by Cognis).

The high surface area functionalized graphene sheets, which are also referred to herein as "FGS", are graphite sheets having a surface area of from about 300 to about 2630 $m^2/g$. In some embodiments of the present invention, the FGS primarily, almost completely, or completely comprise fully exfoliated single sheets of graphite (often referred to as "graphene), while in other embodiments, they may comprise partially exfoliated graphite sheets, in which two or more sheets of graphite have not been exfoliated from each other. The FGS may comprise mixtures of fully and partially exfoliated graphite sheets.

One method of obtaining graphene sheets is from graphite and/or graphite oxide (also known as graphitic acid or graphene oxide). Graphite may be treated with oxidizing and intercalating agents and exfoliated. Graphite may also be treated with intercalating agents and electrochemically oxidized and exfoliated. Graphene sheets may be formed by ultrasonically exfoliating suspensions of graphite and/or graphite oxide in a liquid. Exfoliated graphite oxide dispersions or suspensions can be subsequently reduced to graphene sheets. Graphene sheets may also be formed by mechanical treatment (such as grinding or milling) to exfoliate graphite or graphite oxide (which would subsequently be reduced to graphene sheets).

Reduction of graphite oxide to graphene may be by means of chemical reduction using hydrogen gas or other reducing agents. Examples of useful chemical reducing agents include, but are not limited to, hydrazines (such as hydrazine, N,N-dimethylhydrazine, etc.), sodium borohydride, hydroquinone, and the like. For example, a dispersion of exfoliated graphite oxide in a carrier (such as water, organic solvents, or a mixture of solvents) can be made using any suitable method (such as ultrasonication and/or mechanical grinding or milling) and reduced to graphene sheets.

In a preferred method, graphite is oxidized to graphite oxide, which is then thermally exfoliated to form high surface area functionalized graphene sheets that are in the form of thermally exfoliated graphite oxide, as described in US 2007/0092432, the disclosure of which is hereby incorporated herein by reference. The thusly formed functionalized graphene sheets may display little or no signature corresponding to graphite or graphite oxide in its X-ray or electron diffraction patterns.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, and the like. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. A preferred intercalation agent includes sulfuric acid. Graphite may also be treated with intercalating agents and electrochemically oxidized.

Exfoliation, including the exfoliation of graphite oxide is preferably carried out at temperatures of at least 250° C. or more, preferably at temperatures of from 250 to 3000° C.

The FGS used in the present invention preferably have a surface area of from about 300 to about 2630 m²/g, or more preferably from about 350 to about 2400 m²/g, or still more preferably of from about 400 to about 2400 m²/g, or yet more preferably of from about 500 to about 2400 m²/g. In another preferred embodiment, the surface area is about 300 to about 1100 m²/g. A single graphite sheet has a maximum calculated surface area of 2600 m²/g. The surface area includes all values and subvalues therebetween, especially including 400, 500, 600, 700, 800, 900, 100, 110, 1200, 1300, 1400, 1500, 1600, 1700, 1800, 1900, 2000, 2100, 2200, 2300, 2400, and 2500 m²/g.

Surface area can be measured using either the nitrogen adsorption/BET method or, preferably, a methylene blue dye method.

The dye method is carried out as follows: A known amount of FGS is added to a flask. At least 1.5 grams of methylene blue are then added to the flask per gram of FGS. Ethanol is added to the flask and the mixture is ultrasonicated. The ethanol is then evaporated and a known quantity of water is added to the flask to re-dissolve the free methylene blue. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of methylene blue that was initially added and the amount present in solution as determined by UV-vis spectrophotometry is assumed to be the amount of methylene blue that has been adsorbed onto the surface of the FGS. The surface area of the FGS is then calculated using a value of 2.54 m² of surface covered per one mg of methylene blue adsorbed.

The FGS preferably has a bulk density of from about 40 to about 0.1 kg/m³. The bulk density includes all values and subvalues therebetween, especially including 0.5, 1, 5, 10, 15, 20, 25, 30, 35 kg/m³.

The FGS typically has a carbon to oxygen ratio (C:O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1. In some embodiments of the invention, the carbon to oxygen ratio is at least about 10:1, or least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1.

The coatings may optionally contain electrically conductive components other than the functionalized graphene sheets such as metals (including metal alloys), conductive metal oxides, polymers, carbonaceous materials other than the high surface area functionalized graphene sheets, and metal-coated materials. These components can take a variety of forms, including particles, powders, flakes, foils, needles, etc.

Examples of metals include, but are not limited to silver, copper, aluminum, platinum, palladium, nickel, chromium, gold, bronze, and the like. Examples of metal oxides include antimony tin oxide and indium tin oxide and materials such as fillers coated with metal oxides. Metal and metal-oxide coated materials include, but are not limited to metal coated carbon and graphite fibers, metal coated glass fibers, metal coated glass beads, metal coated ceramic materials (such as beads), and the like. These materials can be coated with a variety of metals, including nickel.

Examples of electrically conductive polymers include, but are not limited to, polyacetylene, polyethylene dioxythiophene, polyaniline, polypyrroles, and the like.

Examples of carbonaceous materials other than the high surface area functionalized graphene sheets include, but are not limited to, carbon black, graphite, carbon nanotubes, vapor-grown carbon nanofibers, carbon fibers, metal coated carbon fibers.

The coatings may optionally comprise one or more carriers in which some or all of the components are dissolved, suspended, or otherwise dispersed or carried. Examples of suitable carriers include, but are not limited to, water, distilled or synthetic isoparaffinic hydrocarbons (such Isopar® and Norpar® (both manufactured by Exxon) and Dowanol® (manufactured by Dow), citrus terpenes and mixtures containing citrus terpenes (such as Purogen, Electron, and Positron (all manufactured by Purogen)), limonene, aliphatic petroleum distillates, alcohols (such as methanol, ethanol, n-propanol, i-propanol, n-butanol, i-butanol, sec-butanol, tert-butanol, diacetone alcohol, butyl glycol, and the like), ketones (such as acetone, methyl ethyl ketone, cyclohexanone, i-butyl ketone, 2,6,8,trimethyl-4-nonanone and the like), esters (such as methyl acetate, ethyl acetate, n-propyl acetate, i-propyl acetate, n-butyl acetate, i-butyl acetate, carbitol acetate, and the like), glycol ethers (such as propylene glycol monomethyl ether and other propylene glycol ethers, ethylene glycol monobutyl ether and other ethylene glycol ethers, ethylene and propylene glycol ether acetates), N-methyl-2-pyrrolidone, and mixtures of two or more of the foregoing and mixtures of one or more of the foregoing with other carriers. Preferred solvents include low- or non-VOC solvents, non-hazardous air pollution solvents, and non-halogenated solvents.

The coatings may optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, cross-linking and curing agents, and the like. In one embodiment of the present invention, the surfactant is at least one ethylene oxide/propylene oxide copolymer.

Examples of dispersing aids include glycol ethers (such as polyethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes.

Examples of grinding aids include stearates (such as Al, Ca, Mg, and Zn stearates) and acetylenic diols (such as those sold by Air Products under the trade names Surfynol® and Dynol®).

Examples of adhesion promoters include titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec.

Examples of thickening agents include glycol ethers (such as polyethylene oxide), block copolymers derived from ethylene oxide and propylene oxide (such as those sold under the trade name Pluronic® by BASF).

The functionalized graphene sheets are preferably present in the coating in at least about 0.01 weight percent based on the total weight of the coating. In one embodiment of the invention, the FGS are preferably present in the coatings in at least about 0.01 weight percent, or more preferably in at least about 0.05 weight percent, or yet more preferably in at least about 0.1 weight percent, or still more preferably in at least about 0.5 weight percent, or even more preferably in at least about 1 weight percent, where the weight percentages are based on the total weight of the coating after it has been applied to a substrate and subjected to any post-application treatments (such drying, curing, cross-linking, etc.). However, as will be appreciated by those skilled in the art, the amount of FGS present in the coatings can be selected based on the desired properties and the particular binders and other optional components chosen.

In one embodiment of the present invention, the coatings are electrically conductive and preferably have a conductivity of at least about $10^{-8}$ S/cm. In an embodiment of the invention, when it is desirable that the coatings be semiconductors, they preferably have a conductivity of about $10^{-8}$ S/cm to about $10^3$ S/cm, or more preferable of about $10^{-7}$ S/cm to about $10^3$ S/cm. In another embodiment of the invention, the coatings preferably have a conductivity of at least about $10^2$ S/cm, or more preferably at least about $10^3$ S/cm, or yet more preferably at least about $10^4$ S/cm. The conductivities of the coatings are determined after they have been applied to a substrate and subjected to any post-application treatments (such drying, curing, cross-linking, etc.).

In one embodiment of the invention, the coatings contain a sufficient amount of FGS such that they have electrical conductivities that are greater than those of the corresponding materials containing each component of the coating in question except for the FGS.

The coatings may be made using any suitable method, including wet or dry methods and batch, semi-continuous, and continuous methods.

For example, components of the coatings, such as two or more of the functionalized graphene sheets, binders, carriers, and/or other components may be blended by using suitable mixing, dispersing, and/or compounding techniques and apparatus, including ultrasonic devices, high-shear mixers, two-roll mills, three-roll mills, cryogenic grinding crushers, extruders, kneaders, double planetary mixers, triple planetary mixers, high pressure homogenizers, ball mills, attrition equipment, sandmills, and horizontal and vertical wet grinding mills, and the like.

The resulting blends may be further processed by grinding using wet or dry grinding technologies. The technologies can be continuous or discontinuous. Examples include ball mills, attrition equipment, sandmills, and horizontal and vertical wet grinding mills. Suitable materials for use as grinding media include metals, carbon steel, stainless steel, ceramics, stabilized ceramic media (such as yttrium stabilized zirconium oxide), PTFE, glass, tungsten carbide, and the like.

After blending and/or grinding steps, additional components may be added to the coatings, including, but not limited to, thickeners, viscosity modifiers, and the like. The coatings may also be diluted by the addition of more carrier.

After they have been applied to a substrate, the coatings may be cured using any suitable technique, including drying and oven-drying (in air or another inert or reactive atmosphere), UV curing, IR curing, microwave curing or drying, and the like.

The coatings may be applied to a wide variety of substrates, including, but not limited to, metals; polymeric materials; fabrics (including cloths) and textiles; glasses and other minerals; ceramics; silicon surfaces; wood; pulp-based materials such as paper, and cardboard; silicon and other semiconductors; laminates; concrete, bricks, and other building materials; and the like. The substrates may have been treated with other coatings or similar materials before the coatings of the present invention are applied.

Examples of polymeric materials include, but are not limited to, those comprising thermoplastics and thermosets, including polyolefins (such as polyethylene, polypropylene, and the like); polyimides; polyesters (such as poly(ethylene terephthalate), poly(ethylene naphthalate), and liquid crystalline polyesters); polyamides (including polyterephthalamides); aramids (such as Kevlar® and Nomex®); fluoropolymers (such as fluorinated ethylene propylene (FEP), polytetrafluoroethylene (PTFE), polyvinyl fluoride), poly(vinylidene fluoride), and the like); polyetherimides; poly(vinyl chloride); poly(vinylidene chloride); polyurethanes; cellulosic polymers; SAN; ABS; polycarbonates; polyacrylates; thermoset epoxies and polyurethanes; elastomers (including thermoplastics and thermosets and including rubbers (such as natural rubber) and silicones); and the like.

The coatings may be in a variety of forms, including, but not limited to, suspensions, solutions, pastes, and materials in substantially solid form containing little or no liquids. They may be free-flowing, viscous, solid, powdery, and the like.

The coatings may be applied to a substrate using any suitable method, including, but not limited to, painting, spin casting, solution casting, printing (including ink jet printing), electrospray printing or painting, dip coating, powder coating, and the like. The coatings can be applied in multiple layers.

When applied to a substrate, the coatings can have a variety of forms. They can be present as a film or lines, patterns, and other shapes. The coatings may be covered with additional material, such as overcoatings, varnishes, polymers, fabrics, and the like.

When applied to a substrate, the coatings can have a variety of thicknesses. In one embodiment of the invention, when applied to a substrate the coating can preferably have a thickness of at least about 2 nm, or more preferably at least about 5 nm. In various embodiments of the invention, the coatings can have a thickness of about 2 nm to 2 mm, about 5 nm to 1 mm, about 2 nm to about 100 nm, about 2 nm to about 200 nm, about 2 nm to about 500 nm, about 2 nm to about 1 micrometer, about 5 nm to about 200 nm, about 5 nm to about 500 nm, about 5 nm to about 1 micrometer, about 5 nm to about 50 micrometers, about 5 nm to about 200 micrometers, about 10 nm to about 200 nm, about 50 nm to about 500 nm, about 50 nm to about 1 micrometer, about 1 micrometer to about 2 mm, about 1 micrometer to about 1 mm, about 1 micrometer to about 500 micrometers, about 1 micrometer to about 200 micrometers, about 1 micrometer to about 100 micrometers, about 50 micrometers to about 1 mm, about 100 micrometers to about 2 mm, about 100 micrometers to about 1 mm, about 100 micrometers to about 750 micrometers, about 100 micrometers to about 500 micrometers, about 500 micrometers to about 2 mm, or about 500 micrometers to about 1 mm.

The coatings can be applied to the same substrate in varying thicknesses at different points and can be used to build up three-dimensional structures on the substrate.

The coatings can be used for the passivation of surfaces, such as metal (e.g. steel, aluminum, etc.) surfaces, including exterior structures such as bridges and buildings. Examples of other uses of the coatings of the invention include: UV radiation resistant coatings, abrasion resistant coatings, coatings having permeation resistance to liquids (such as hydrocarbon, alcohols, water, and the like) and/or gases, electrically conductive coatings, static dissipative coatings, and blast and impact resistant coatings. They can be used to make fabrics having electrical conductivity. The coatings can be used in solar cell applications; signage, flat panel displays; flexible displays, including light-emitting diode, organic light-emitting diode, and polymer light-emitting diode displays; backplanes and frontplanes for displays; and lighting, including electroluminescent and OLED lighting.

The coatings can be used on electrical and electronic devices and components, such as housings and the like, to provide EMI shielding properties. They made be used in microdevices (such as microelectromechanical systems (MEMS) devices) including to provide antistatic coatings.

The coatings can be used to form thermally conductive channels on substrates or to form membranes having desired flow properties and porosities. Such materials could have highly variable and tunable porosities and porosity gradients can be formed. The coatings can be used to form articles having anisotropic thermal and/or electrical conductivities. The coatings can be used to form three-dimensional printed prototypes

EXAMPLES

Preparation of Test Samples

The coatings in the form of liquid dispersions are printed onto a substrate using a doctor blade and then dried in air in an oven at 125° C. to form a film. Testing is done on the printed films (coatings).

Electrical Conductivity

The point-to-point bulk electrical resistance (in ohms) of the films is measured using a standard multimeter across contact points situated about 1 inch apart. Where resistivites are quoted in ohms/square, two spots of silver paste having a diameter of about 0.3 mm are applied to the surface of the film about 1 inch apart. The resistance across these points is also measured using a standard multimeter and the reading is divided by 10 to calculate the resistivity in ohms/square. Results given as a single number are an average of several measurements and results given as a range of figures indicate the high and low readings from several measurements.

Peel Resistance

The coatings are tested for resistance to peeling by firmly applying a piece of 3M Scotch® tape 232 to a portion of a printed film that includes at least one edge of the film. The tape is pulled off the film rapidly and the adhesive underside of the tape is checked for peeling. The peel resistance of the film is assessed as follows: excellent is no transfer of film to the tape; very good is a few small spots of film scattered on the surface of the tape; good is a number of small spots of film on the tape; fair is a thin layer of film or a large chunk of film on the tape; poor is separation of the film from the substrate or removal of a large of a large portion of the film. In some cases no cohesive film adhered to the substrate is formed.

Scratch Resistance

A fingernail is drawn back and forth across the surface of the film five times. The surface of the film where it was scratched and the tip of the nail are examined and the scratch resistance of the film is assessed as follows: excellent is no noticeable transfer of the film surface to the nail; very good is minimal transfer and no noticeable indentation on the surface of the film; good is some indentation of the film surface; fair is removal of a substantial portion of the film; and poor is where the substrate is visible. In some cases no cohesive film adhered to the substrate is formed.

Coating Preparation Methods

The components of the coatings are combined using the following techniques and apparatus:

Ultrasonicator: The sample is circulated by a gear pump between a Hielscher UIP1000hd ultrasonic device operating at 100% power and equipped with a low amplitude (B2-1.8) booster and a high-shear mixer having a roto-stator overhead stirrer.

Ball mill A1: A Union Process 01HD vertical grinding mill.

Ball mill A2: A Union Process 01HDDM vertical grinding mill.

Ball mill B: An Eiger Mini 250 Type M250-VSE-TEFV horizontal grinding mill.

Ball mill C: A vertical stainless steel vertical grinding mill having four stainless steel arms situated 90° away from each other. The mill is driven by a compressed air motor and has a bottom discharge valve.

High shear mixer: A homogenizer having a roto-stator overhead stirrer.

Ingredients Used in the Formulations:

Electron and Positron are citrus terpene-based solvents supplied by Ecolink, Tucker Ga.

The components used in Examples 1-8 are given in Table 1. The approximate carbon to oxygen ratio of the FGS used in each example is also given in Table 1.

Example 1

Ethylene cellulose polymer(Ethocel® Standard 45, supplied by Dow), FGS, and isopropyl alcohol are ground in ball mill B at 5100 rpm for 100 minutes a 0.8 mm 5% yttrium stabilized zirconium oxide grinding medium. Dispersing agent (EFKA 5071, an alkylol ammonium salt of a high-molecular weight carboxylic acid supplied by Ciba) is added to the mixture, which is then ground for another 10 minutes. The resulting coating adheres to paper, glass, and aluminum foil.

Example 2

Ethylene/vinyl acetate copolymer (EVA) (405T, supplied by Honeywell) is combined with the carrier and FGS in ball mill B and ground at 5000 rpm for 100 minutes using a 0.8 mm 5% yttrium stabilized zirconium oxide grinding medium. The mixture is then ground for an additional 100 minutes using a 0.3 mm 5% yttrium stabilized zirconium oxide grinding medium. The resulting coating adheres to coated paper, glass, and aluminum foil.

Example 3

The carrier and FGS are combined in ball mill A1 and ground at 600 rpm for one hour using a grinding medium of 1816 grams of 3/16" diameter stainless steel balls. Ethylene/acrylic acid copolymer (EAA) (A-C® 5120, supplied by Honeywell) is added to the mixture, which is then further ground for six hours at 650 rpm. The resulting coating adheres to paper, glass, and aluminum foil.

Example 4

Ethylene/acrylic acid copolymer (EAA) (A-C® 5120, supplied by Honeywell) and styrene/maleic anhydride copolymer (SMA) (SMA 1440 Flake, supplied by Sartomer) are combined with the carrier and FGS in ball mill A1 and ground at 650 rpm for seven hours using a grinding medium of 1816 grams of 3/16" diameter stainless steel balls. The resulting coating adheres to uncoated paper.

Example 5

The carrier and surfactant (Surfynol 104; supplied by Air Products) are dispersed for 10 minutes in ball mill A2 (which is equipped with a three disk stirrer) using a grinding medium of 1256 g of 1 mm chrome steel balls run at 2000 rpm. The FGS is then added and the mixture is further ground for 30 minutes. Acrylic dispersion (Joncryl® 142, supplied by BASF) is added and the mixture is ground for two hours. Poly(ethylene oxide) having an average molecular weight of 600,000 is added and the mixture is ground for another three hours. The resulting coating adheres to paper, glass, and aluminum foil.

Example 6

The carrier and FGS are combined in a Union Process 01 HD attritor and ground at 600 rpm for 30 minutes using a grinding medium of 1816 grams of 3/16" diameter stainless steel balls. Very low molecular weight acrylic copolymer (Joncryl 682, supplied by BASF) and is added to the mixture, which is then further ground for six hours at 650 rpm. The resulting coating adheres to paper, glass, and aluminum foil.

Example 7

Polyethylene is dissolved in the carrier by heating for about 20 minutes until a clear solution is formed. FGS is added while the solution is stirred and the resulting mixture is dispersed using the ultrasonicator for about 1.5 hours. The resulting coating has poor adhesion to coated paper and a resistance of about 4 k$\Omega$.

Example 8

Butyl methacrylate/methyl methacrylate copolymer (Elvacite® 4044, supplied by Lucite International) is dissolved in the carrier. FGS is added and the resulting mixture is dispersed using the ultrasonicator for about 15 minutes. The mixture is periodically cooled in the high shear mixture portion of the apparatus. The resulting coating adheres to coated paper.

TABLE 1

All ingredient quantities are in weight percent based on the total weight of the composition

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Polymer | Type | Ethylene cellulose | EVA | EVA | EVA | Acrylic dispersion | Low MW acrylic resin | Polyethylene | BMA/MMA |
| | Amount | 6.1 | 6 | 16 | 12 | 15.6 | 16 | 8.3 | 9 |
| Polymer | Type | — | — | — | SMA | — | — | — | — |
| | Amount | — | — | — | 4 | — | — | — | — |
| FGS | C:O ratio | 20:1 | 20:1 | 50:1 | 50:1 | 50:1 | 50:1 | 50:1 | 50:1 |
| | Amount | 1.5 | 1.5 | 2.5 | 2.5 | 2.4 | 2.5 | 2.8 | 1.2 |
| Carrier | Type | Isopropyl alcohol | Electron | Electron | Positron | Water | Positron | Electron | Electron |
| | Amount | 91.4 | 92.5 | 81.5 | 81.5 | 77.1 | 81.5 | 88.9 | 89.8 |
| Additive | Type | Dispersing agent | — | — | — | Surfactant | — | — | — |
| | Amount | 1 | — | — | — | 2.4 | — | — | — |
| Additive | Type | — | — | — | — | PEO | — | — | — |
| | Amount | — | — | — | — | 2.4 | — | — | — |

Example 9

A 4.9 weight percent aqueous solution of poly(ethylene oxide) (PEO) having an average molecular weight of 600,000 (236.2 g) is combined with FGS having a C:O ratio of approximately 100:1 (2.4 g), surfactant (Pluronic F127, supplied by BASF) (2.4 g), antifoaming agent (AF 204, supplied by Sigma) (0.3 g), and water (50 g). The mixture is ground in ball mill C at 650 rpm using 3/16" stainless steel balls as a grinding medium for 6 hours. The resulting coating is applied to thermally stabilized PET, coated paper, and uncoated paper and the adhesion properties and electrically resistivity of the resulting films are measured. The results are given in Table 2.

Example 10

A 10.8 weight percent aqueous solution of poly(ethylene oxide) (PEO) having an average molecular weight of 600,000 (110.8 g) is combined with FGS having a C:O ratio of approximately 100:1 (2.4 g), surfactant (Surfynol 104H, supplied by Air Products) (2.4 g), antifoaming agent (AF 204, supplied by Sigma) (0.2 g), and water (134.2 g). The mixture is ground in ball mill C at 693 rpm using 3/16" stainless steel balls as a grinding medium for six hours. The resulting coating is applied to thermally stabilized PET, coated paper, and uncoated paper and the adhesion properties and electrically resistivity of the resulting films are measured. The results are given in Table 2.

TABLE 2

| | Thermally stabilized PET | | Coated Paper | | Uncoated paper | |
| --- | --- | --- | --- | --- | --- | --- |
| | Peel resistance | Resistivity (Ω/sq.) | Peel resistance | Resistivity (Ω/sq.) | Peel resistance | Resistivity (Ω/sq.) |
| Example 9 | Good | 5-10 | Fair/good | 7-10 | Poor | 4-5 |
| Example 10 | Fair/good | 10 | Fair/good | 8-12 | Poor | 6-7 |

Examples 11-17

In the case of Examples 11-15, a 20 weight percent solution of polyamide binder (Versamid 750, supplied by Cognis) in isopropyl alcohol (200 g) is combined with FGS having a C:O ratio of approximately 100:1 (10 g) and additional isopropyl alcohol (40 g). In the case of Examples 16 and 17, a 20 weight percent solution of polyamide binder (Versamid 750, supplied by Cognis) in isopropyl alcohol (70 g) is combined with FGS having a C:O ratio of approximately 100:1 (6 g) and additional isopropyl alcohol (124 g).

In all cases, the resulting suspensions are ground for 1.5 hours at 100° F. in ball mill B at 5000 rpm for 1.5 hours using 0.3 mm 5% yttrium stabilized zirconium oxide as the grinding medium. In the cases of Examples 12 and 15, BYK-ES80 (an alkylolammonium salt of an unsaturated acidic carboxylic acid ester supplied by BYK USA, Wallingford, Conn.) (0.2 g) is added to 10 g of the resulting coating. In the cases of Examples 14 and 17, a 10 weight percent solution of polyaniline (PANI) (Panipol F, supplied by Panipol Oy, Porvoo, Finland) in chloroform (2 g) is added to 10 g of the resulting coating. After each of these additives is added, the resulting mixture is blended for about a minute in the high shear mixer. In each case the resulting coating is printed on thermally stabilized PET and the adhesion properties and electrical resistivity of the resulting films are measured. The results are given in Table 3.

TABLE 3

| | Additive | Peel resistance | Scratch resistance | Resistivity (Ω/sq.) |
| --- | --- | --- | --- | --- |
| Example 11 | none | Excellent | Excellent | 15 |
| Example 12 | BYK | Very good | Very good | 12 |
| Example 13 | none | Excellent | Excellent | 18-23 |
| Example 14 | PANI | Excellent | Excellent | 15-25 |
| Example 15 | BYK | Excellent | Excellent | 15 |
| Example 16 | none | Excellent | Excellent | 20 |
| Example 17 | PANI | Good | Good | 17 |

The invention claimed is:

1. A coating, comprising functionalized graphene sheets and at least one binder,
   wherein the functionalized graphene sheets have a carbon to oxygen ratio of at least about 50:1.
2. The coating of claim 1, wherein the binder is a polymeric binder.
3. The coating of claim 1, further comprising one or more carriers.
4. The coating of claim 1, further comprising one or more dispersants.
5. The coating of claim 1, wherein the coating has an electrical conductivity of at least about $10^{-8}$ S/cm.
6. The coating of claim 1, wherein the coating has an electrical conductivity of at least about $10^3$ S/cm.
7. The coating of claim 1, wherein the functionalized graphene sheets have a surface area of at least about 300 m$^2$/g.
8. The coating of claim 1, wherein the functionalized graphene sheets have a surface area of from about 400 to about 2400 m$^2$/g.
9. The coating of claim 1, further comprising at least one electrically conductive polymer.
10. The coating of claim 1, further comprising at least one carbonaceous materials other than the functionalized graphene sheets.
11. A method for coating a substrate having a surface, comprising the step of applying a coating comprising functionalized graphene sheets and at least one binder to the surface, wherein the functionalized graphene sheets have a carbon to oxygen ratio of at least about 50:1.
12. The method of claim 11, wherein the substrate comprises a polymeric material.
13. The method of claim 11, wherein the substrate is a metal.
14. The method of claim 11, wherein the substrate is a fabric, textile, or pulp product.
15. The method of claim 11, wherein the coating has an electrical conductivity of at least about $10^{-8}$ S/cm.
16. The method of claim 11, wherein the coating has an electrical conductivity of at least about $10^3$ S/cm.
17. The method of claim 11, wherein the functionalized graphene sheets have a surface area of at least about 300 m$^2$/g.
18. The method of claim 11, wherein the functionalized graphene sheets have a surface area of from about 400 to about 2400 m$^2$/g.
19. An article coated with a coating comprising functionalized graphene sheets having at least one binder, wherein the functionalized graphene sheets have a carbon to oxygen ratio of at least about 50:1.
20. The article of claim 19 in the form of an electrical or electronic component housing.
21. The article of claim 19, wherein the coating has an electrical conductivity of at least about $10^{-8}$ S/cm.
22. The article of claim 19, wherein the coating has an electrical conductivity of at least about $10^3$ S/cm.

23. The coating of claim 1, wherein the functionalized graphene sheets have a carbon to oxygen ratio of at least about 100:1.

24. The method of claim 11, wherein the coating has an electrical conductivity of at least about $10^2$ S/cm.

25. The coating of claim 1, wherein the binder is one or more polymers selected from the group consisting of poly(ethylene oxide)s, poly(propylene oxide)s, ethylene oxide/propylene oxide copolymers, cellulosic resins, ethyl cellulose, ethyl hydroxyethyl cellulose, carboxymethyl cellulose, cellulose acetate, cellulose acetate propionates, cellulose acetate butyrates, poly(vinyl butyral, polyvinyl alcohol, ethylene/vinyl acetate polymers, acrylic polymers and copolymers, styrene/acrylic copolymers, styrene/maleic anhydride copolymers, isobutylene/maleic anhydride copolymers, vinyl acetate/ethylene copolymers, ethylene/acrylic acid copolymers, polyolefins, polystyrenes, olefin and styrene copolymers, epoxy resins, acrylic latex polymers, polyester acrylate oligomers and polymers, polyesterdiol diacrylate polymers, UV-curable resins, and polyamides.

* * * * *